United States Patent
Helling et al.

(10) Patent No.: US 6,313,196 B1
(45) Date of Patent: Nov. 6, 2001

(54) INK JET INK

(75) Inventors: Günter Helling, Odenthal; Stefan Herrmann, Bonn, both of (DE)

(73) Assignee: AGFA-Gevaert (BE)

( * ) Notice: Subject to any disclaimer, the term of this patent is extended or adjusted under 35 U.S.C. 154(b) by 0 days.

(21) Appl. No.: 09/237,822

(22) Filed: Jan. 27, 1999

(30) Foreign Application Priority Data

Feb. 3, 1998 (DE) .............................................. 198 04 123

(51) Int. Cl.⁷ .......................... C09D 11/02; C09D 11/10; C08L 75/04; C08L 77/00
(52) U.S. Cl. .......................... 523/160; 524/590; 524/606; 528/45
(58) Field of Search .......................... 528/45, 302, 308.6; 524/590, 601, 602, 606; 523/160, 161, 507, 508; 106/31.17, 31.19, 31.2

(56) References Cited

U.S. PATENT DOCUMENTS

| 3,397,989 | | 8/1968 | Keberle et al. | 96/114 |
|---|---|---|---|---|
| 3,970,601 | * | 7/1976 | Weber et al. | 524/590 |
| 4,237,264 | * | 12/1980 | Noll et al. | 528/67 |
| 4,238,378 | * | 12/1980 | Markusch et al. | 524/591 |
| 4,246,154 | | 1/1981 | Yao et al. | 260/29.6 |
| 4,576,998 | * | 3/1986 | Ellerbe, III et al. | 524/455 |
| 4,788,284 | * | 11/1988 | Masukawa et al. | 544/139 |
| 5,385,957 | * | 1/1995 | Tobias et al. | 523/161 |
| 5,416,145 | * | 5/1995 | Askeland et al. | 524/83 |
| 5,837,754 | * | 11/1998 | Shimomura et al. | 523/161 |
| 5,973,025 | * | 10/1999 | Nigam et al. | 523/160 |
| 5,985,988 | * | 11/1999 | Hodge | 524/604 |
| 6,034,154 | * | 3/2000 | Kase et al. | 523/161 |
| 6,126,139 | * | 10/2000 | Toyota et al. | 384/43 |

FOREIGN PATENT DOCUMENTS

| 14 72 746 | | 3/1969 | (DE) . |
|---|---|---|---|
| 28 45 375 | | 4/1979 | (DE) . |
| 495406 | * | 7/1992 | (EP) . |

* cited by examiner

Primary Examiner—Vasu Jagannathan
Assistant Examiner—Callie E. Shosho
(74) Attorney, Agent, or Firm—Connolly Bove Lodge & Hutz LLP

(57) ABSTRACT

An ink jet ink consisting of a dispersion of particles of an ionically modified polymer loaded with dye is distinguished by improved smudge resistance.

22 Claims, No Drawings

INK JET INK

This invention relates to an ink for the production of ink jet images, which are sprayed in a fine imagewise modulated jet onto a suitable recording material. The recording material consists of a transparent, semi-transparent or opaque support and an image-receiving layer located thereon.

The ink jet process is known (cf for example the chapter, "Ink jet printing" by R. W. Kenyon in *Chemistry & Technology of Printing & Imaging Systems*, editor Peter Gregory, Blackie Academic & Professional, Chapman & Hall, 1996, pp. 113–138, and the literature cited therein).

One problem associated with ink jet images is stability and smudge resistance.

It is known from EP 672 538 to add reactive components to the substrate coating compositions in order to produce water-resistant and smudge resistant ink jet prints. On subsequent irradiation of the image, these additives crosslink the coating composition, so improving the smudge resistance of the dye which has previously been transferred into these binders.

A disadvantage of this process is that a further, costly processing stage such as irradiation with UV light is required after the printing operation. Moreover, it is necessary to add further additives, for example photoinitiators, which have a tendency to yellow on storage and make the image white unattractive. Furthermore, short periods of irradiation with UV light do not bring about the desired improvement in the washing out of the prints.

The object underlying the invention is to provide an ink for ink jet printing processes which yields on various substrates without any special preparation a printed image having elevated gloss and good resistance to smudging and water and elevated light and dark stability.

It is furthermore known, in order to improve water resistance or for applications exposed to the weather, to use hydrophobic dyes which are insoluble in water, as are described, for example in *Research Disclosure* (*RD*) 30 887 (1989). Disadvantageously, these dyes must be dispersed in order to produce aqueous inks and conventional aqueous dispersions have excessively large particles and after printing exhibit an excessively wide absorption line and consequently poor colour reproduction.

It is known from DE 28 45 375 to impregnate vinyl polymer lattices with dye and to use them for the ink jet process. The low colloid stability of the impregnated latex particles and the tendency to clog the nozzles are disadvantages of this process.

A further object is to avoid this clogging of the nozzles.

It has now been found that inks consisting of a dispersion of particles of an ionically modified polymer which are loaded with dye satisfy the stated requirements.

The ionically modified polymers are preferably ionomeric polyaddition or polycondensation products.

Each 100 g of the ionomeric polyaddition or polycondensation products used according to the invention contain 4 to 180 milliequivalents, preferably 4 to 100 milliequivalents of ionic groups or groups convertible into ionic groups and optionally 1 to 20 wt. % of alkylene oxide units of the formula —$CH_2$—$CH_2$—O— incorporated within a polyether chain, wherein the polyether chain may be in lateral position or contained in the main chain.

Included among the ionomeric polyaddition or polycondensation products (which will be referred to below as "ionomeric products") usable according to the invention are polyurethanes, polyesters, polyamides, polyureas, polycarbonates, polyacetals or polyethers, as well as further ionomeric products simultaneously belonging to two or more polymer types, such as for example polyester polyurethanes, polyether polyurethanes, polyester polyureas.

Ionomeric products as may be used according to the invention are known per se and are described, for example, in *Angewandte Makromolekulare Chemie* 26 (1972), pp. 45–106; *Angewandte Makromolekulare Chemie* 82 (1979), pp. 53 et seq.; *J. Oil. Col. Chem. Assoc.* 53 (1970), p. 363. Further descriptions of suitable ionomeric products may be found in German published patent applications (DE-A-) 26 37 690, 26 42 973, 26 51 505, 26 51 506, 26 59 617, 27 29 245, 27 30 514, 27 32 131, 27 34 576 and 28 11 148.

Ionomeric products having ionic groups are preferred. Ionomeric products particularly suitable for the process of the invention are described in DE-B2-1 472 745. These ionomeric products are based on polyurethanes which are obtained from compounds having two or more reactive hydrogen atoms and a molecular weight of 300 to 10000, polyisocyanates and optionally chain extenders having reactive hydrogen atoms. During or after the production of these polyurethanes, isocyanates still present therein are reacted with a compound having at least one active hydrogen and at least one salt-like group or group capable of salt formation. Where compounds having groups capable of salt formation are used, the resultant anionic polyurethanes are subsequently at least partially converted into the salt form in a manner known per se.

The term "salt-like group" is preferably taken to mean the following groups: —$SO_3^-$, —$COO^-$.

Suitable starting components for the production of the anionic polyurethanes are, for example, the compounds described below:

I. Compounds Having Active Hydrogen Atoms

These compounds are substantially linear and have a molecular weight of approx. 300 to 10000, preferably of 500 to 4000. The per se known compounds have terminal hydroxyl and/or amino groups. Polyhydroxyl compounds are preferred, such as polyesters, polyacetals, polyethers, polyamides and polyesteramides. The hydroxyl value of these compounds is approx. 370 to 10, in particular 225 to 28.

Polyethers which may be mentioned are, for example, the polymerisation products of ethylene oxide, propylene oxide, tetrahydrofuran, butylene oxide and the co- or graft polymerisation products thereof, as well as the condensation products obtained by condensation of polyhydric alcohols or mixtures thereof and the products obtained by alkoxylation of polyhydric alcohols.

Polyacetals which may be considered are, for example, the compounds which may be produced from hexanediol and formaldehyde. Suitable polyesters, polyesteramides and polyamides are the predominantly linear condensation products obtained from polybasic, saturated carboxylic acids and polyhydric, saturated alcohols, aminoalcohols, diamines and mixtures thereof.

Polyhydroxyl compounds already containing urethane or urea groups, as well as optionally modified natural polyols such as castor oil or carbohydrates may also be used.

The lyophilicity or hydrophobicity and the mechanical properties of the products of the process may, of course, be varied by using mixtures of different polyhydroxyl compounds.

II. Polyisocyanates

Suitable polyisocyanates are any aromatic and aliphatic diisocyanates, such as for example 1,5-naphthylene diisocyanate, 4,4'-diphenylmethane diisocyanate, 4,4'- diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate, the isomers of tolylene diisocyanate, optionally blended, preferably the aliphatic diisocyanates, 1,4-butane diisocyanate, 1,6-hexane diisocyanate, dicyclohexylmethane diisocyanate, 1,4-cyclohexane diisocyanates and isophorone diisocyanate.

III. Chain Extenders

Chain extenders having reactive hydrogen atoms include:
1. conventional glycols, such as ethylene glycol or condensation products of ethylene glycol, butanediol, 1,2-propanediol, 1,3-propanediol, neopentyl glycol, hexanediol, bishydroxymethylcyclohexane;
2. aliphatic, cycloaliphatic and aromatic diamines such as ethylenediamine, hexamethylenediamine, 1,4-cyclohexyldiamine, benzidine, diaminodiphenylmethane, the isomers of phenylenediamine, hydrazine, ammonia;
3. aminoalcohols such as ethanolamine, propanolamine, butanolamine;
4. polyfunctional amines or hydroxyl compounds such as diethylenetriamine, triethylenetetramine, tetraethylenepentamine, pentaethylenehexamine, hexaethyleneheptamine, glycerol, pentaerythritol, 1,3-diaminoisopropanol, 1,2-diaminopropanol, the monooxyalkylated polyamines, such as for example N-oxyethylethylenediamine, N-oxyethylhydrazine, N-oxyethylhexamethylenediamine;
5. water.

IV. Compounds Capable of Salt Formation
  1. Compounds having an already formed acid group.
     a) Hydroxy acids, such as for example glyceric acid, lactic acid, trichlorolactic acid, malic acid, dioxymaleic acid, dioxyfumaric acid, tartaric acid, dioxytartaric acid, citric acid, dimethylolpropionic acid and dimethylolbutyric acid, the aliphatic, cycloaliphatic, aromatic and heterocyclic mono- and diaminocarboxylic acids such as glycine, α-and β-alanine, 6-aminocaproic acid, 4-aminobutyric acid, the isomeric mono- and diaminobenzoic acids, the isomeric mono- and diaminonaphthoic acids;
     b) hydroxy- and carboxysulfonic acids; 2-hydroxyethanesulfonic acid, 2-phenolsulfonic acid, 3-phenolsulfonic acid, 4-phenolsulfonic acid, 2,4-phenolsulfonic acid, sulfoacetic acid, m-sulfobenzoic acid, p-sulfobenzoic acid, 1-benzoic acid 3,5-disulfonic acid, 2-chloro-1-benzoic acid 4-sulfonic acid, 2-hydroxy-1-benzoic acid 5-sulfonic acid, 1-naphtholsulfonic acid, 1-naphtholdisulfonic acid, 8-chloro-1-naphtholdisulfonic acid, 1-naphtholtrisulfonic acid, 2-naphthol-1-sulfonic acid and 2-naphtholtrisulfonic acid;
     c) aminosulfonic acids; amidosulfonic acid, hydroxylaminemonosulfonic acid, hydrazinedisulfonic acid, sulfanilic acid, N-phenylaminomethanesulfonic acid, 4,6-dichloroaniline-2-sulfonic acid, 1,3-phenylenediamine-4,6-disulfonic acid, 1-naphthyleneaminesulfonic acid, 2-naphthylaminesulfonic acid, naphthylaminedisulfonic acid, naphthylaminetrisulfonic acid, 4,4'-di-(p-aminobenzoylamino)diphenylurea-3,3'-disulfonic acid, phenylhydrazine-2,5-disulfonic acid, taurine, methyltaurine, butyltaurine, 3-amino-1-benzoic acid 5-sulfonic acid, 3-aminotoluene-N-methanesulfonic acid, 4,6-diaminobenzene-1,3-disulfonic acid, 2,4-diamino-5-toluenesulfonic acid, 4,4'-diaminodiphenyl-2,2'-disulfonic acid, 2-aminophenol-4-sulfonic acid, 4,4'-diaminodiphenyl ether 2-sulfonic acid, 2-aminoanisole-N-methanesulfonic acid, 2-aminodiphenylaminesulfonic acid, ethylene glycolsulfonic acid, 2,4-diaminobenzenesulfonic acid, N-sulfonatoethylethyleneamine;
     d) also included among the hydroxy- and aminocarboxylic and -sulfonic acids, polycarboxylic and -sulfonic acids are the (optionally saponified) addition products of unsaturated acids such as acrylic acid, methacrylic acid, vinylsulfonic acid, styrenesulfonic acid and unsaturated nitriles such as acrylonitrile, of cyclic dicarboxylic anhydrides such as maleic acid, phthalic acid, succinic anhydride, of sulfocarboxylic anhydrides such as sulfoacetic, o-sulfobenzoic anhydride, of lactones such as β-propiolactone, γ-butyrolactone, the addition products of the reaction products of olefins with sulfur trioxide, such as carbyl sulfate, of epoxycarboxylic and -sulfonic acids such as glycidol acid, 2,3-epoxypropanesulfonic acid, of sultones such as 1,3-propanesultone, 1,4-butanesultone, 1,8-naphthylsultone, of cyclic sulfates such as glycol sulfate, of disulfonic anhydrides such as benzene-1,2-disulfonic anhydride, onto aliphatic and aromatic amines such as 1,2-ethylenediamine, 1,6-hexamethylenediamine, the isomeric phenylenediamines, diethylenetriamine, triethylenetetramine, tetraethylenepentamine, together with the addition products of sodium hydrogen sulfite onto olefinically unsaturated compounds such as allyl alcohol, maleic acid, maleic acid bis-ethylene and bis-propylene glycol esters;
     e) hydrazinecarboxylic acids.
  2. Reactive compounds having 3 to 7 ring members, which have salt-like groups or groups capable of salt formation after ring opening:
     a) dicarboxylic anhydrides such as succinic anhydride, maleic anhydride, optionally hydrogenated phthalic anhydride;
     b) tetracarboxylic dianhydrides such as 1,2,4,5-benzenetetracarboxylic anhydride;
     c) disulfonic anhydrides such as benzene-1,2-disulfonic anhydride;
     d) sulfocarboxylic anhydrides such as sulfoacetic anhydride, o-sulfobenzoic anhydride;
     e) sultones such as 1,3-propanesultone, 1,4-butanesultone, 1,8-naphthosultone;
     f) lactones such as β-propiolactone, γ-butyrolactone;
     g) epoxycarboxylic acids such as glycidol acids, optionally in the form of the alkali metal salts thereof;
     h) epoxysulfonic acids such as 2,3-epoxypropane-1-sulfonic acid, optionally in the form of the alkali metal salts thereof, together with the addition products of epoxyaldehydes and alkali hydrogen sulfites, such as for example the bisulfite compound of glycidaldehyde.

The above acid groups may be converted into the salt form in the conventional manner by reaction with the compounds stated below: inorganic bases, basically reacting or base-eliminating compounds such as monofunctional metal hydroxides, carbonates and oxides, such as sodium hydroxide, potassium hydroxide, sodium carbonate, potassium carbonate, sodium hydrogen carbonate. Together with organic bases, such as tert.-amines, for example trimethylamine, triethylamine, dimethylaminoethanol, dimethylaminopropanol, ammonia and the like.

Further suitable synthesis components are, for example, mono- or dihydric alcohols having ethylene oxide units incorporated within polyether chains.

If such monofunctional, nonionic hydrophilic polyethers are used, it may frequently be advantageous to prevent premature chain termination by also using synthesis components which are more than difunctional. Monofunctional polyethers of the above stated general formula are produced using processes which are known per se, as are described, for example, in U.S. Pat. Nos. 3,905,929, 4,190,566 or 4,237,264.

Such synthesis components impart additional localised hydrophilisation, electrolyte stability, freeze stability and improved sliding properties to the polyurethanes to be used according to the invention.

The quantity of the polyisocyanates is preferably selected such that all groups capable of reacting with isocyanate groups react.

The reaction is optionally performed with the additional use of solvents, wherein low-boiling solvents which have a boiling point lower than 120° C. and may optionally also contain a proportion of water, are preferably suitable, such as for example acetone, methyl ethyl ketone, acetonitrile, tetrahydrofuran, dioxane. Water, optionally without the addition of organic solvents, may be used as the solvent for inorganic bases and compounds having at least one isocyanate-reactive hydrogen and at least one salt-like group or group capable of salt formation.

The predominantly linear high molecular weight polyurethanes generally take the form of clear to slightly opalescent solutions in the stated polar solvents. The solids content thereof is approx. 5 to 50 wt. % of ionic polyurethane. Polyester polyurethanes or polyether polyurethanes are preferably used.

The following Examples are intended to illustrate the production process for the ionomeric products used according to the invention.

Polymer 1

An NCO prepolymer (1.78% NCO) is produced in 1.5 hours at 75 to 85° C. from 800 g (0.356 mol) of a polyester prepared from adipic acid and 1,4-butanediol (dehydrated) and 95 g (0.546 mol) of 2,4-tolylene diisocyanate. While hot, the prepolymer is dissolved in 1060 g of tetrahydrofuran and combined at 50° C. with a solution of 53 g (0.13 mol) of an aqueous solution of the sodium salt of N-sulfonatoethylenediamine in 100 ml of water. After 5 minutes, due to the sharp increase in viscosity, the mixture is combined with a further 500 g of tetrahydrofuran. A clear polyurethane polyurea solution is obtained having the following characteristic data:

| | |
|---|---|
| Solids content: | 35.3% |
| Viscosity (24° C.): | 1000 mPa.s |
| Viscosity (24° C.) of a sample of the solution adjusted to 30% with tetrahydrofuran: | 40 mPa.s |
| Sulfonate group content: | 14.1 milliequivalents/100 g |

Polymer 2

The same method is used as described for polymer 1, but using acetone as the solvent instead of tetrahydrofuran. Using 1060 g of acetone and 42.5 g (0.104 mol) of an aqueous solution of the sodium salt of N-sulfonatoethylethylenediamine, a clear polyurethane polyurea solution is obtained having a solids content of 43.6% and a viscosity of 5700 mPaxs (24° C.). A solution adjusted to a solids content of 30% has a viscosity of 300 mPaxs (24° C.). The sulfonate group content is 14.1 milliequivalents/100 g.

Polymer 3

An NCO prepolymer (NCO=1.68%) is produced as described for polymer 1 from 400 g (0.178 mol) of a polyester prepared from adipic acid and 1,4-butanediol (dehydrated) and 47.5 g (0.273 mol) of tolylene diisocyanate (65:35 isomer mixtures). While hot, the prepolymer is dissolved in 980 g of acetone and combined at 50° C. with an aqueous solution prepared from 42.5 g (0.104 mol) of the sodium salt of N-sulfonatoethylethylenediamine and 75 ml of water. A slightly yellow solution of a polyurethaneurea is obtained.

| | |
|---|---|
| Solids content: | 30.0% |
| Viscosity (23° C.): | 2200 mPa.s |
| Sulfonate group content: | 22.2 milliequivalents/100 g |

Polymer 4

An NCO prepolymer (4.11% NCO) is produced in 6.5 hours at 100° C. from 550 g (1.0 mol) of a polyether based on bisphenol A and propylene oxide and 140 g (0.08 mol) of a polyester prepared from phthalic acid, adipic acid and ethylene glycol (all dehydrated) together with 145 g (0.239 mol) of a 70% solution of a propoxylated addition product of butenediol and sodium bisulfite in toluene and 315 g (1.875 mol) of 1,6-diisocyanatohexane. The prepolymer is combined with 77 g (1.283 mol) of urea, briefly heated to 135° C. and stirred at 130° C. until no NCO is any longer detectable from the IR spectrum. While being cooled, the mixture is then combined first with 290 ml of water and then with 290 ml of water and then with 1582 g of acetone. A clear, slightly yellow solution of a polyurethane polyurea in acetone is obtained.

| | |
|---|---|
| Solids content: | 40% |
| Viscosity (23° C.): | 60 mPa.s |
| Sulfonate group content: | 19 milliequivalents/100 g |

Polymer 5

2200 g (4.0 mol) of a polyether based on bisphenol A and propylene oxide and 115 g (0.053 mol) of a monofunctional polyether prepared from n-butanol, propylene oxide and ethylene oxide are dehydrated and combined with 160 g (0.113 mol) of a 70% solution of the sodium salt from the description of polymer 4 in toluene. The mixture is then combined at 60° C. with 1096 g (6.30 mol) of tolylene diisocyanate (80:20 isomer mixture, deactivated with 20 mg of hydrogen chloride). Despite cooling, the temperature rises to 60° C. Stirring is continued for 5 hours at 80° C. (NCO=4.95%) and the mixture adjusted to a solids content of 70% with acetone and reacted with 152 g (1.350 mol) of acetone ketazine.

900 g of this solution are then combined with 733 ml of acetone and 95 ml of water and stirred overnight at room temperature. A clear polyurethane polyurea solution is obtained.

| | |
|---|---|
| Solids content: | 36.5% |
| Viscosity: | 19000 mPa.s |
| Sulfonate group content: | 7.5 milliequivalents/100 g |

A solution adjusted to a solids content of 30% by dilution with acetone has a viscosity of 3000 cp.

Polymer 6

407.4 g (0.2396 mol) of hexanediol/neopentyl glycol polyadipate are dehydrated at 120° C. under a water-jet vacuum. The substance is combined at 70–80° C. with 77.7 g (0.4625 mol) of 1,6-diisocyanatohexane and stirred for a further 1.5 h at 100° C. The prepolymer has an NCO content of 3.4%. After adjusting to 33% in acetone, the solution is combined at 50° C. with 75.0 g (0.1924 mol) of 2-aminoethyl-β-aminopropionic acid sodium salt (39.5% in water) and, after 7 minutes, dispersed with 1160 ml of completely deionised water. Once the acetone has been removed by distillation under a water-jet vacuum, a very finely divided dispersion is obtained.

Data

% COO⁻: 1.6
% solids: 30
pH: 7.6
particle size: 60 nm

Polymer 7

650 g (0.3824 mol) of hexanediol/neopentyl glycol polyadipate and 21 g of a polyoxyethylene/polyoxypropylene (80:20) polyether of a molecular weight of 2150 started on n-butanol are dehydrated at 120° C. under a water-jet vacuum. After cooling to 60° C., the substance is combined with 125.6 g (0.7475 mol) of 1,6-diisocyanatohexane, the mixture is heated to 100° C. and stirred for 90 minutes at this temperature. The temperature is reduced to 60° C. and the reaction product dissolved in 530 g of acetone. The new 60% solution contains 3.1 wt. % NCO.

The particle dispersions containing dyes (dye latex) used according to the invention are produced by stirring water into a solution of the water-insoluble dyes and the ionomeric product in a water-miscible, low-boiling solvent or solvent/water mixture.

The solvent is separated from the resultant dispersion by distillation or by other suitable separation methods such as for example dialysis or ultrafiltration.

According to another embodiment, the solution of the water-insoluble dyes in a water-miscible, low-boiling solvent may be combined with the solution of the urethane prepolymer, which still contains NCO groups, whereupon polyaddition is taken to completion in the presence of the dyes. This embodiment may in particular advantageously be used if the dyes contain no isocyanate-reactive groups.

Water-miscible organic solvents suitable for the production of the dispersion are those which are capable of dissolving both the ionomeric products and the dyes. Examples of such solvents are acetone, tetrahydrofuran, dioxane, isopropanol, methanol, ethanol, methyl ethyl ketone, acetonitrile.

The quantity of dye used to produce the dispersion is generally 2 to 200 wt. %, relative to the ionically modified polymer. Preferred weight ratios of dye to polymer are 1:20 to 1:1.

This process makes it possible to produce dispersions of dyes having a particle size of below 150 nm. The average particle size (diameter) is preferably in the range from 10 to 100 nm. In contrast, the particles of dispersions produced using conventional oil formers are distinctly larger.

Water-insoluble dyes suitable for the loading process are known, for example, from RD 30 887 (1989), EP 0 495 406, U.S. Pat. No. 5,362,882, EP 465 124. The dyes produced from colour couplers and developers in photographic materials by oxidation are particularly advantageous. Colour couplers are known from RD 37 254, part 4 (1995), p. 288, RD 37 038, part II (1995), p. 80 and RD 38 957, part X, B (1996), p. 616.

Suitable developers are in particular p-phenylenediamine derivatives. Compounds of the formula

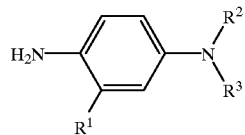

are particularly preferred.

| R¹ | R² | R³ |
|---|---|---|
| H | C₂H₅ | C₂H₅ |
| H | C₂H₅ | C₂H₄OH |
| CH₃ | C₂H₅ | C₂H₅ |
| CH₃ | C₂H₅ | C₂H₄—NH—SO₂CH₃ |
| CH₃ | C₂H₅ | C₂H₄OH |
| CH₃ | C₂H₅ | C₂H₄OCH₃ |
| H | C₄H₉ | C₄H₈SO₃H |

The lattices may also be loaded with suitable light stabilisers and/or antioxidants in addition to the dye, so further increasing the stability of the resultant image.

Suitable stabilisers are o-, m- and p-dihydroxybenzenes, hydroxychromans, 5-hydroxycoumarans, spirochromans, spiroindans, p-alkoxyphenols, sterically hindered phenols, gallic acid derivatives, methylenedioxybenzenes, aminophenols, aminoanilines, sterically hindered amines, derivatives having esterified or etherified phenolic hydroxyl groups or derivatives having acylated or alkylated aromatic amino groups, metal complexes. Detailed descriptions are given in RD 307 105 (1989), section VII, EP 246 766, 273 712, 304 067, 471 341, 524 540, 544 316, 544 317, 545 305, 585 679, 586 343, DE 42 09 346, 43 20 444, 43 23 477 and U.S. Pat. Nos. 5,294,530, 5,278,039.

The dye lattices may furthermore be combined with surface-active compounds.

Apart from natural surface-active compounds, for example saponin, it is mainly synthetic surface-active compounds (surfactants) which are used: nonionic surfactants, for example alkylene oxide compounds, glycerol compounds or glycidol compounds, cationic surfactants, for example higher alkylamines, quaternary ammonium salts, pyridine compounds and other heterocyclic compounds, sulfonium compounds or phosphonium compounds, anionic surfactants containing an acid group, for example carboxylic acid, sulfonic acid, a phosphoric acid, sulfuric acid ester or phosphoric acid ester group, ampholytic surfactants, for example amino acid and aminosulfonic acid compounds together with sulfuric or phosphoric acid esters of an aminoalcohol.

Further surface-active compounds are described in RD 308 119 (1989) and in EP 314 425, 362 990, 549 496, U.S. Pat. Nos. 4,839,262, 4,847,186, 4,916,054, 5,221,603, WO 90/12 782 and WO 92/15 554.

Anionic and nonionic surface-active compounds are preferably used, particularly preferably nonionic compounds.

Examples of dyes are (Y=yellow dyes; M=magenta dyes; C=cyan dyes)

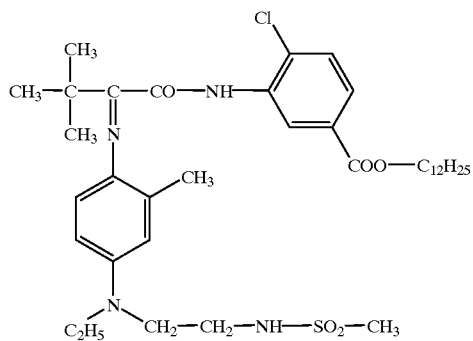
Y-1
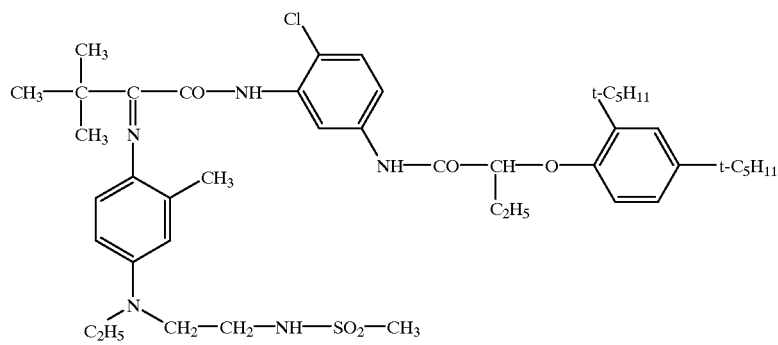
Y-2
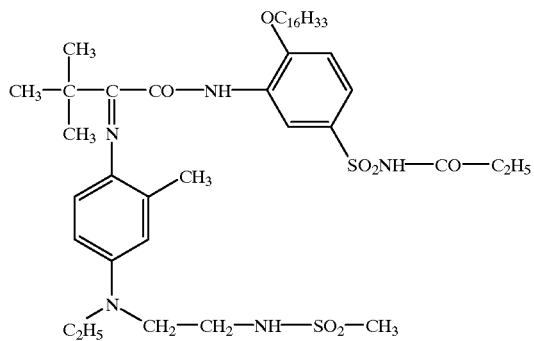
Y-3
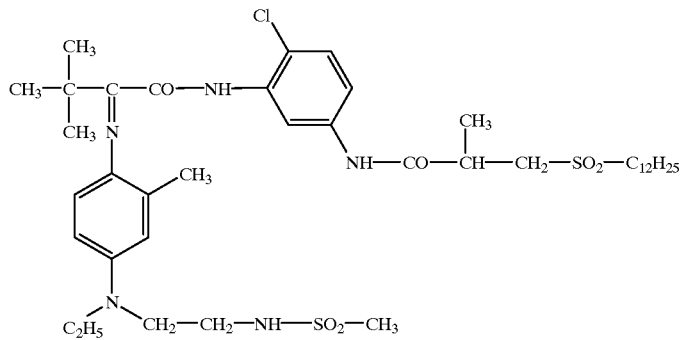
Y-4

Y-5
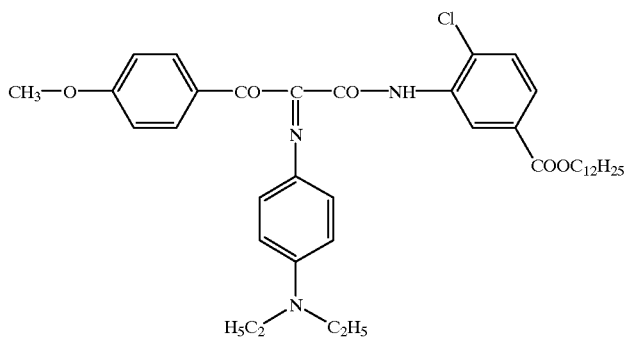
Y-6
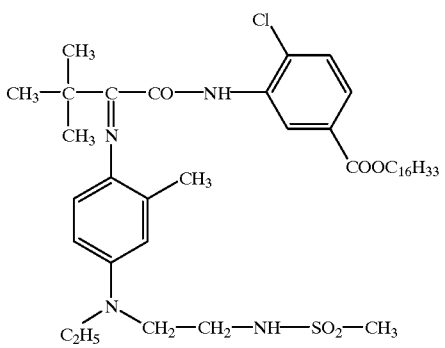
Y-7
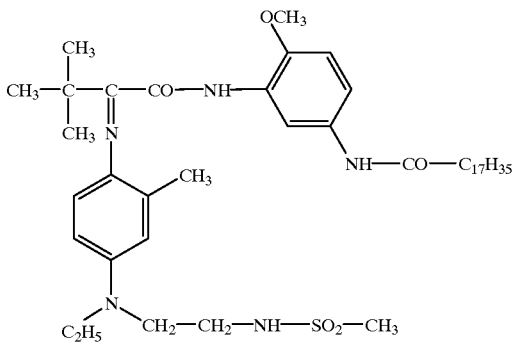
Y-8
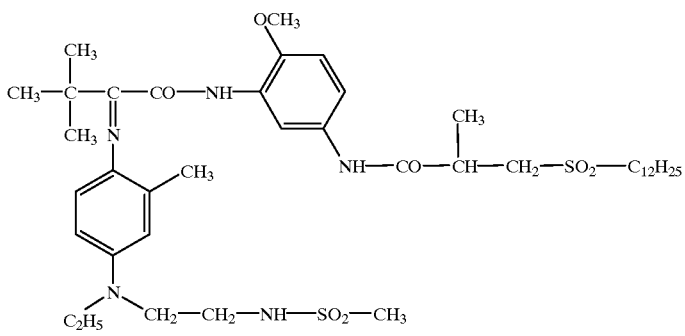

-continued
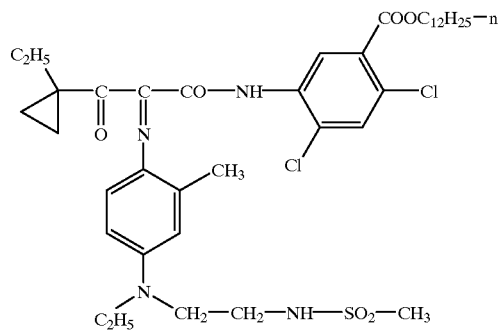
Y-9
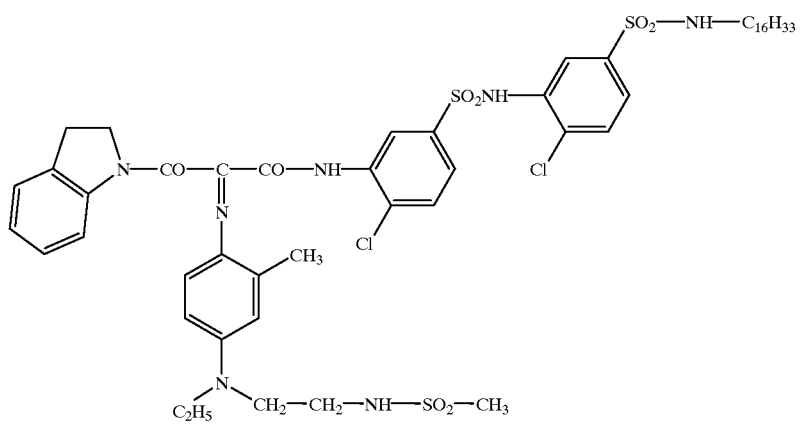
Y10
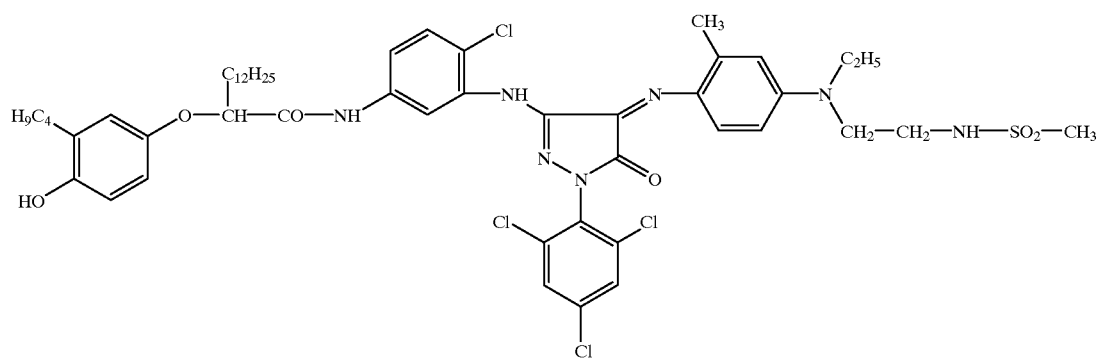
M-1
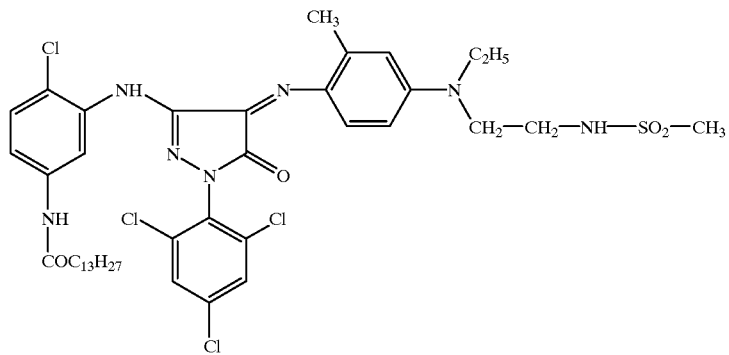
M-2

-continued
M-3
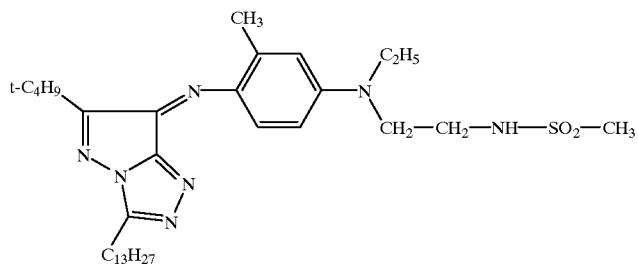
M-4
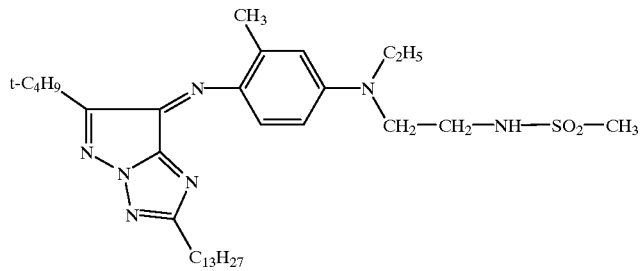
M-5
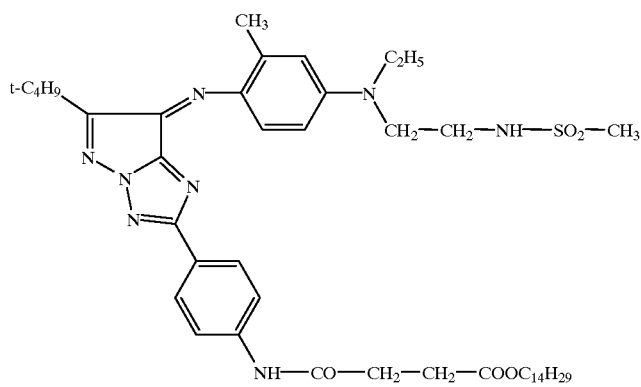
M-6
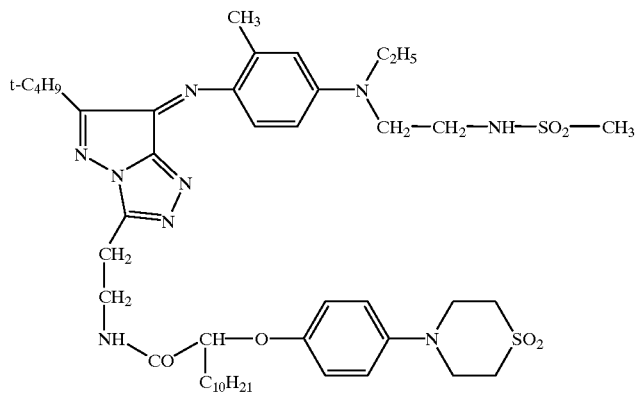
M-7
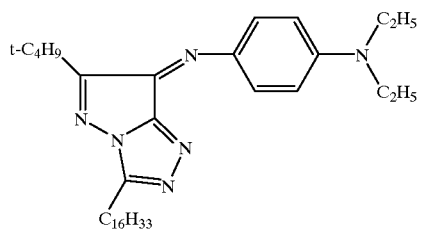

M-8
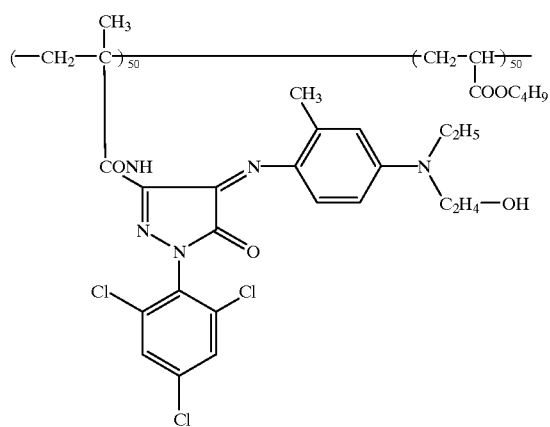
M-9
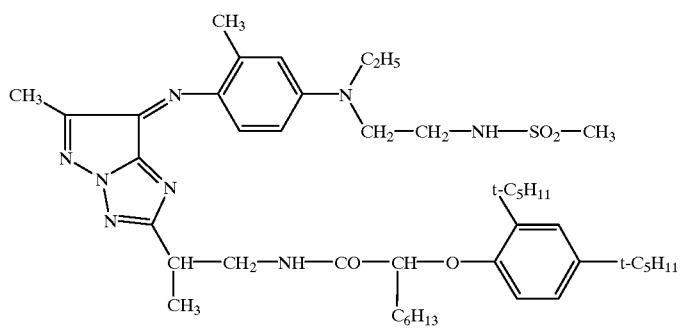
C-1
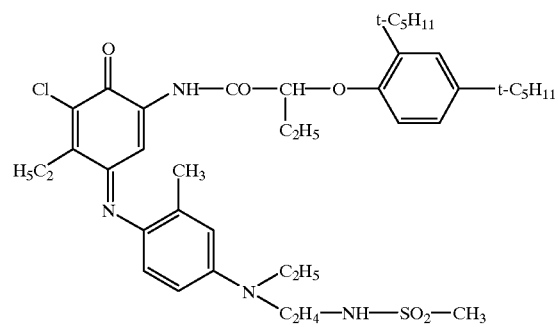
C-2
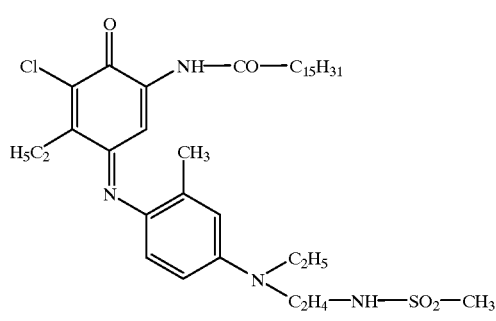
-continued
C-3
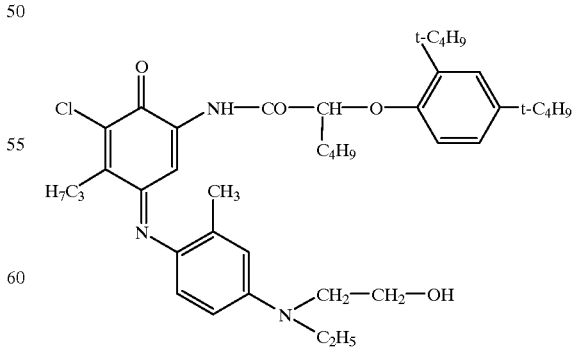

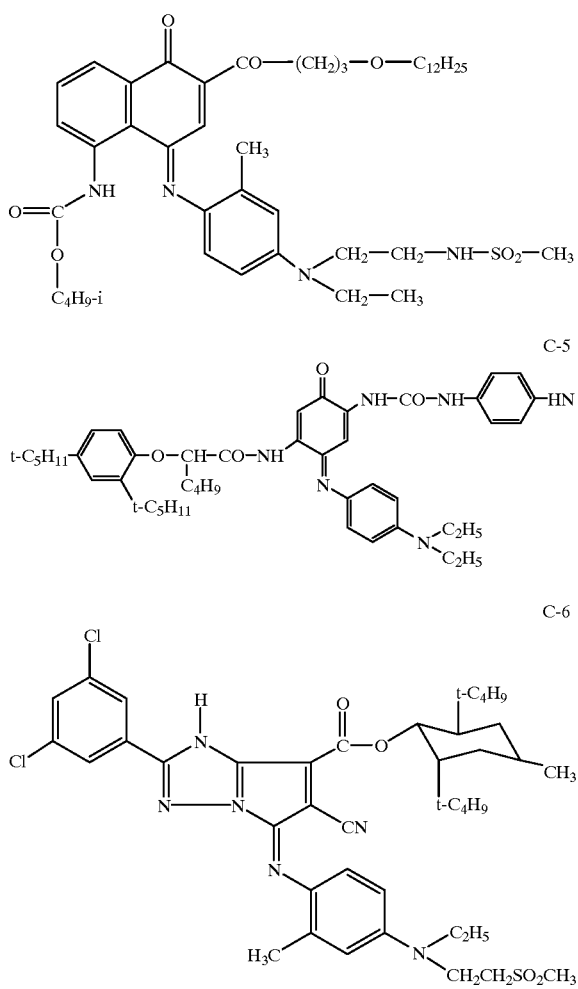

The inks may contain high-boiling, water-insoluble solvents. The high-boiling solvents are used in a quantity of 0.01 to 50 wt. %, relative to the complete ink. A range from 0.1 to 30 wt. % is particularly preferred. Examples of high-boiling solvents are phthalic acid esters such as dibutyl phthalate, dinonyl phthalate, diethylhexyl phthalate, phosphoric acid esters such as tricresyl phosphate, adipic acid esters such as adipic acid dioctyl ester, ethylene glycols, diethylene glycols, triethylene glycols, also partially etherified, 2-pyrrolidinone, di- or polyhydric high-boiling alcohols together with other completely water-miscible solvents boiling at above 140° C. The dye/polymer dispersions produced after the loading process have particle sizes of 10 to 2000 nm, preferably of 30 to 300 nm.

In a preferred embodiment, apart from ionically modified, dye-loaded polymers, the dye/polymer dispersion contains a polymer dispersion or polymer latex as binder.

Production of the Dye Lattices

Dye Latex FL-1

72.7 g of polymer P-6 were combined with 550 g of acetone, heated to 50° C. and combined with a solution prepared from 5.45 g of dye Y-1 dissolved in 80 g of acetone. After 15 minutes, 220 g of water were added dropwise and the acetone was removed by vacuum distillation. The loaded latex is then purified by ultrafiltration and concentrated to the solids content mentioned below. A dye latex having the following data was obtained:

| Solids content: | 20% |
| Average particle size: | 95 nm |
| Ionomer/dye ratio: | 4:1 |
| pH: | 7.0 |

Dye Latex FL-2

36.4 g of polymer P-6 were heated to 50° C. with 220 g of acetone and stirred together with a solution prepared from 1.37 g of dye M-3 and 0.137 g of dibutyl phthalate in 50 g of acetone. 100 g of water were then added and the acetone removed by vacuum distillation. The loaded latex is then purified by ultrafiltration and concentrated to the solids content mentioned below. A dye latex having the following data was obtained:

| Solids content: | 20.5% |
| Average particle size: | 82 nm |
| Ionomer/dye ratio: | 8:1 |
| pH: | 7.0 |

Further dye latices FL-3 to FL-16 were produced in a similar manner (table 1).

TABLE 1

| Dye latex | Dye | Ionomer | Ionomer/dye ratio | Additive | wt. %[1] | Particle size, nm | Solids content, % |
|---|---|---|---|---|---|---|---|
| FL-3 | Y-2 | P-4 | 3:1 | ST-1 | 70 | 84 | 19.8 |
| FL-4 | Y-6 | P-4 | 3:1 | TCP | 30 | 98 | 21.3 |
| FL-5 | Y-3 | P-5 | 6:1 | ST-2 | 60 | 110 | 20.4 |
| FL-6 | Y-5 | P-5 | 3:1 | DBP | 20 | 76 | 20.1 |
| FL-7 | M-1 | P-6 | 4:1 | ST-3 | 40 | 62 | 21.8 |
| FL-8 | M-4 | P-6 | 4:1 | DBP | 20 | 85 | 20.7 |
| FL-9 | M-6 | P-6 | 3:1 | ST-4 | 30 | 91 | 19.3 |
| FL-10 | M-7 | P-6 | 8:1 | DBP | 20 | 63 | 19.9 |
| FL-11 | M-5 | P-2 | 2:1 | TCP | 10 | 74 | 20.5 |
| FL-12 | M-3 | P-2 | 4:1 | ST-5 | 30 | 80 | 20.7 |
| FL-13 | M-3 | P-6 | 6:1 | ST-4/ST-5 | 30/80 | 85 | 20.1 |
| FL-14 | C-1 | P-6 | 3:1 | ST-5 | 30 | 124 | 21.5 |
| FL-15 | C-2 | P-6 | 4:1 | DBP | 20 | 68 | 20.0 |
| FL-16 | C-5 | P-6 | 6:1 | — | — | 87 | 19.8 |

[1]relative to dye

Stabilisers and solvents used in the dye lattices

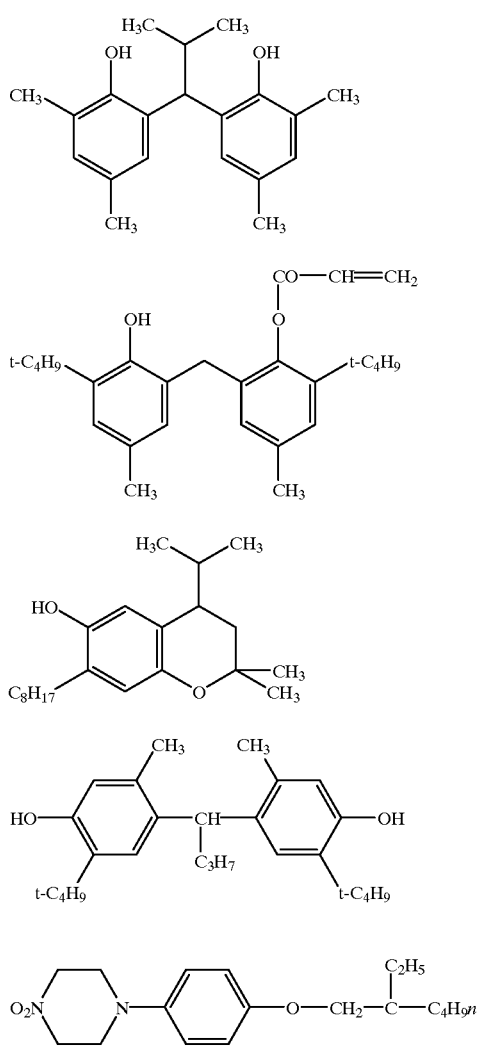

ST-1
ST-2
ST-3
ST-4
ST-5

TCP tricresyl phosphate
DBP dibutyl phthalate

EXAMPLES

Example 1

38.5 ml of diethylene glycol, 1.2 ml of ethylene glycol monomethyl ether, 1 g of 20 wt. % aqueous, nonionic nonyleneoxypolyglycidol and 60.3 ml of demineralised water are added in succession to 100 ml of dye solution FL-1. The mixture is stirred for 10 minutes in an ultrasound bath, centrifuged and filtered through a microfilter of a pore size of 0.45 µm. A ready-to-use yellow ink is obtained.

Example 2

40.2 ml of diethylene glycol, 0.9 ml of ethylene glycol monomethyl ether, 1 g of 20 wt. % aqueous, nonionic nonyleneoxypolyglycidol and 62.9 ml of demineralised water are added in succession to 100 ml of dye solution FL-2. The mixture is stirred for 10 minutes in an ultrasound bath, centrifuged and filtered through a microfilter of a pore size of 0.45 µm. A ready-to-use magenta ink is obtained.

Example 3

37.6 ml of diethylene glycol, 1.5 ml of ethylene glycol monomethyl ether, 1 g of 20 wt. % aqueous, nonionic nonyleneoxypolyglycidol and 61.9 ml of demineralised water are added in succession to 100 ml of dye solution FL-15. The mixture is stirred for 10 minutes in an ultrasound bath, centrifuged and filtered through a microfilter of a pore size of 0.45 µm. A ready-to-use cyan ink is obtained.

Example 4

50.4 ml of FL-1, 14.8 ml of FL-2 and 34.8 ml of FL-15 are vigorously stirred together and combined in succession with 38.4 ml of diethylene glycol, 1.3 ml of ethylene glycol monomethyl ether as well as 60.3 ml of demineralised water. The mixture is stirred for 10 minutes in an ultrasound bath and a sample tested for any possible colour cast. The mixture is then centrifuged and filtered through a microfilter of a pore size of 0.45 µm. A ready-to-use black ink is obtained.

Example 5

As Example 4, but using 50.9 ml of FL-3, 15.1 ml of FL-12 and 34.0 ml of FL-14.

Tests

The inks are each introduced into an Epson Stylus 500 ink cartridge. Printing is performed at a resolution of 360 dpi on standard 80 g/m² paper. Each test image contains 10 50 mm² colour fields at colour densities of 10, 25, 50 and 100%.

Water Resistance

The assessment is made by immersing the test image after 15 minutes' drying in demineralised water at 25° C. for a period of 0.2, 1, 5, 10 and 60 minutes and evaluating the extent to which the colours have run. Ratings: K, no visible running; L, slight margins around the colour fields; S, severe running of the colours. Control E: mixed grey from 30% of each of the Epson Stylus 500 colour inks (file values).

|  | Example | | | | | |
| --- | --- | --- | --- | --- | --- | --- |
| Time | 1 | 2 | 3 | 4 | 5 | E (control) |
| 0.2 min | K | K | K | K | K | L |
| 1 min | K | K | K | K | K | S |
| 5 min | K | K | K | K | K | S |
| 10 min | K | K | K | K | K | S |
| 60 min | K | K | K | K | L | S |

Resistance to humidity was additionally tested by storing the test images for 3 days at 40° C./95% relative humidity. No changes occurred in Examples 1 to 5 during this test. The control, E, exhibited distinct colour fringes around all the colour fields.

Drying

After 0, 2 and 5 minutes, a sheet of standard white paper is placed upon the printed test images and then rolled with a rubber roller at 4 kg/cm². Colour transfer onto the applied sheet is evaluated. Control E as above. Rating: K, no colour transfer; L, slight colour transfer; $S_x$, severe colour transfer of colour x.

|  | Example | | | | | |
| --- | --- | --- | --- | --- | --- | --- |
| Time | 1 | 2 | 3 | 4 | 5 | E (control) |
| 0 min | K | K | K | K | L | $S_{all}$ |
| 2 min | K | K | K | K | K | $S_{all}$ |
| 5 min | K | K | K | K | K | $S_{yellow}$ |

Light Fastness

The test images are exposed to $14.4 \times 10^6$ luxh of light with a 10/10 sec. light/darkness cycle. The loss of density in the 100% fields is measured. Control E as above.

| Example | 1 | 2 | 3 | 4 | 5 | E (control) |
|---------|---|---|---|---|---|-------------|
| ΔD(%)   | 12 | 10 | 8 | 14 | 4 | 45 |

Bleeding

All the printer's colour cartridges are filled with the coloured inks 1 to 3 described above and the extent to which the colours run together evaluated. To this end, a special test image is printed, in which a triangle of a second colour is printed in fields of each colour (0°, 45° and 90° edge). Bleeding is rated from 1 (very good, sharp colour separation) to 5 (very poor, no sharp colour border).

|            | Example | 1 | 2 | 3 | 4 |
|------------|---------|---|---|---|---|
| in Example | 1       | — | 1 | 2 | 1 |
|            | 2       | 1 | — | 1 | 1 |
|            | 3       | 1 | 1 | — | 1 |
|            | 4       | 2 | 2 | 1 | — |

Example 6

Dye solution FL-1 (160 ml) is diluted with 40 ml of acetone and stirred. The resultant solution is cast using a cascade caster onto 160 g/m² gauge paperboard. Application: 5 μm wet. After drying with air at a temperature of 40° C., a yellow paperboard provided with a water-resistant coating on one side is obtained.

Example 7

As Example 6, except that casting is performed on a 10 μm gauge polyester film.

The materials of Examples 6 and 7 are immersed for 4 hours in demineralised water at 25° C. In both cases, neither colour changes nor delamination occur.

The materials may be used, for example, for packaging purposes.

What is claimed is:

1. Ink jet ink which comprises a dispersion of particles of an ionically modified polymer loaded with dye, wherein the ionically modified polymer is predominately linear polyurethane, polyamide, polyurea, polycarbonate, polyacetal, polyether, polyester polyurethane, polyether polyurethane or polyester polyurea.

2. Ink jet ink according to claim 1 wherein each 100 g of the ionically modified polymer contains 4 to 180 milliequivalents of ionic groups or groups convertible into ionic groups.

3. Ink jet according to claim 1, wherein the ionic modification consists essentially of —SO₃—,—COO⁻groups or mixtures thereof.

4. Ink jet ink according to claim 1, wherein the dye is used in a quantity of 2 to 200 wt. %, relative to ionically modified polymer.

5. Ink jet ink according to claim 1, wherein the dispersion particles have an average particle diameter of less than 150 nm.

6. Ink jet ink according to claim 1, wherein the dyes are produced from photographic color couplers and color photographic developers.

7. Ink jet ink according to claim 1, wherein the dyes are of the formula

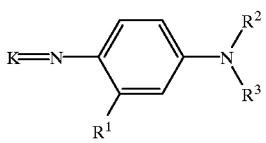

in which
K means the residue of a photographic color coupler,
R₁ means a hydrogen atom or a methyl group,
R₂ means an alkyl group having 1 to 4 C atoms and
R₃ means an alkyl group having 1 to 4 C atoms optionally substituted by sulfo, hydroxy, alkylsulfonylamino or alkoxy.

8. The inkjet recording of claim 7, wherein said photographic color coupler is yellow, cyan or magenta coupler.

9. The inkjet material according to claim 1, wherein each 100 grams of the ionically modified polymer contains 4 to 100 milliequivalents of ionic groups or groups convertible into ionic groups.

10. The ink jet ink as claimed in claim 1, wherein said polymer is soluble in an organic solvent.

11. Ink jet ink which comprises a dispersion of particles of an ionically modified polymer loaded with dye, wherein the ionically modified polymers are predominantly linear, polyurethanes, polyester polyurethanes or polyether polyurethanes.

12. Ink jet ink according to claim 11, wherein each 100 g of the ionically modified polymer contains 4 to 180 milliequivalents of ionic groups or groups convertible into ionic groups.

13. Ink jet according to claim 11, wherein the ionic modification consists essentially of —SO₃—,—COO⁻ groups or mixtures thereof.

14. Ink jet ink according to claim 11 wherein the dye is used in a quantity of 2 to 200 wt. %, relative to ionically modified polymer.

15. Ink jet ink according to claim 11, wherein the dispersion particles have an average particle diameter of less than 150 nm.

16. Ink jet ink according to claim 11, wherein the dyes are produced from photographic color couplers and color photographic developers.

17. Ink jet ink according to claim 11, wherein the dyes are of the formula

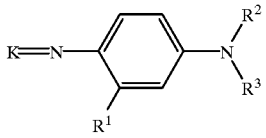

in which
K means the residue of a photographic color coupler,
R₁ means a hydrogen atom or a methyl group,
R₂ means an alkyl group having 1 to 4 C atoms and
R₃ means an alkyl group having 1 to 4 C atoms optionally substituted by sulfo, hydroxy, alkylsulfonylamino or alkoxy.

18. The inkjet recording of claim 17, wherein said photographic color coupler is yellow, cyan or magenta coupler.

19. A recording material for ink jet ink coated by spraying the ink in a fine imagewise modulated jet onto the material, wherein the ink comprises a dispersion of particles of an ionically modified polymer loaded with dye, wherein the ionically modified polymer is predominantly linear polyurethane, polyamide, polyurea, polycarbonate, polyacetal, polyether, polyester polyurethane, polyether polyurethane or polyester polyurea and wherein the recording material consists of a transparent, semi-transparent or opaque support and an image-receiving layer located thereon.

20. The recording material as claimed in claim 19, wherein the ionically modified polymer is polyurethane, polyester polyurethane or polyether polyurethane.

21. The recording material as claimed in claim 19, wherein said polymer is soluble in an organic solvent.

22. Ink jet ink which comprises a dispersion of particles of an ionically modified polymer loaded with dye, wherein the ionically modified polymer is predominantly linear polyurethane, polyamide, polyurea, polycarbonate, polyacetal, polyether, polyester polyurethane, polyether polyurethane or polyester polyurea and wherein said polymer is soluble in an organic solvent.

* * * * *